United States Patent [19]

Clamen et al.

[11] 3,856,626

[45] Dec. 24, 1974

[54] FERMENTATION PROCESS FOR THE SIMULTANEOUS PRODUCTION OF PROTEIN AND BIO POLYMERS

[75] Inventors: Allen Clamen, Westfield, N.J.; Bruce L. Dasinger, Niantic, Conn.

[73] Assignee: Exxon Research and Engineering Company, Linden, N.J.

[22] Filed: June 9, 1972

[21] Appl. No.: 261,191

[52] U.S. Cl. ............... 195/49, 195/28 R, 195/115, 426/7
[51] Int. Cl. ............................................ C12d 1/00
[58] Field of Search .................... 195/28 R, 31 P, 49

[56] References Cited
UNITED STATES PATENTS
3,328,262    6/1967    Lindblom et al. ................. 195/31 P
3,674,642    7/1972    Yamatodani et al. ............. 195/28 R FOREIGN PATENTS OR APPLICATIONS
14,796    1969    Japan ............................. 195/31 P

OTHER PUBLICATIONS

Harada et al., "Production of a New Polysacchande, Succinoglucan by Alealigenes Faecalis," Agr. Biol. Chem., pp. 757–762, (1965).

*Primary Examiner*—A. Louis Monacell
*Assistant Examiner*—R. B. Penland
*Attorney, Agent, or Firm*—Joseph J. Dvorak

[57]  ABSTRACT

Fermentation process for the simultaneous production of protein cells and biopolymers in a single fermentation zone is provided by cultivating selected microorganisms on a suitable substrate in an aqueous aerobic fermentation broth.

9 Claims, 1 Drawing Figure

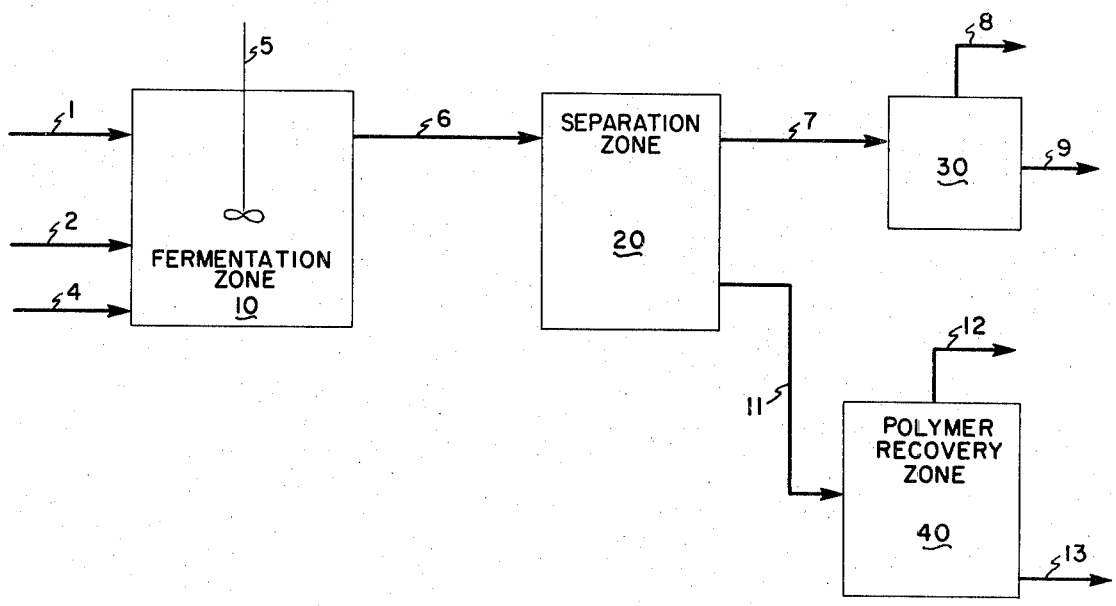

FERMENTATION PROCESS FOR THE SIMULTANEOUS PRODUCTION OF PROTEIN AND BIO POLYMERS

BACKGROUND OF THE INVENTION

The present invention relates broadly to industrial fermentation processes. More particularly, the present invention is concerned with improvement in aerobic fermentation processes for the production of protein and biopolymers such as heteropolysaccharides, polysaccharides and similar materials.

Industrial fermentation processes have been receiving ever-increasing attention as a possible means of producing sufficient food to alleviate the world's shortage of protein. Biosynthetically produced yeast and bacterial cells which are useful as food supplements can be produced by industrial fermentation carbohydrates, hydrocarbons and similar substrates. The processes typically employed require cultivating the selected microorganism on a suitable substrate in a sterile aqueous growth medium and thereafter recovering the fermentation product. Because growth rates of the microorganism are often slow and the energy requirements are frequently high, the product of fermentation processes often is very expensive.

In the production of biopolymers, i.e. polymeric materials produced biosythetically in a fermentation zone, such as polysaccharides, heteropolysaccharides and similar materials, a multi-staged fermentation of a microorganism has been required in order to control cell growth and maturation of the microorganism. In one stage a bio-mass is produced by cultivating microorganisms on substrates such as carbohydrates. In the second, or polymer producing stage of the process, the bio-mass is fermented in a second medium with carbohydrate to produce polymer. While use of the multi-stage process for production of heteropolysaccharides permits the maintenance of conditions in the first stage favorable for the production of bacterial cells at a high rate, such a multi-stage process has numerous drawbacks including the expense of maintaining and operating numerous reactors at different process conditions. Moreover, while the rate of production is improved by use of multi-stages such use inherently introduces difficulties in accurately controlling product quality and the like.

SUMMARY OF THE INVENTION

The present invention is based on the discovery that biopolymers can be produced simultaneously with protein cells in a single fermentation zone by cultivating selected microorganisms on a suitable substrate under aerobic fermentation conditions. The microorganisms capable of simultaneously producing polysaccharides and protein cells are selected from the group consisting of Achromobacter sp. ATCC No. 21575, 21576, 21578 and Alcaligenes faecalis ATCC No. 21577. The preferred substrate is ethanol.

DESCRIPTION OF THE DRAWINGS

The sole FIGURE is a flow sheet schematically illustrating one embodiment of the process of this invention.

DETAILED DESCRIPTION OF THE INVENTION

The process of the present invention may be readily understood by reference to the diagrammatical flow plan illustrating one embodiment of same. Referring specifically to the drawing an oxygenated hydrocarbon feed, such as ethanol, is introduced into an initial reaction zone or fermentation zone 10 by means of line 1.

In the practice of the present invention it is contemplated that other oxygenated hydrocarbon feeds may be employed. Illustrative of these are the following: methanol, acetic acid, n-propanol, formic acid and propionic acid.

A nutrient solution is introduced by means of line 4 into fermentation zone 10 and suitable mixing is secured in the fermentation zone by mixing means 5. A suitable nutrient solution comprises an aqueous mineral salt medium. A very satisfactory medium is prepared as follows:

P-1 Medium

|  | Grams/liter Tap Water |
| --- | --- |
| $(NH_4)_2 HPO_4$ | 10 |
| $K_2HPO_4$ | 5 |
| $Na_2 SO_4$ | 0.5 |

To the above is added 10 ccs. per liter of a salt solution (A) prepared as follows:

| Salt Solution A | Grams/liter Distilled Water |
| --- | --- |
| $Mg SO_4 \cdot 7H_2O$ | 40 |
| $FeSO_4 \cdot 7H_2O$ | 2 |
| $Mn SO_4 \cdot 4H_2O$ | 2 |
| NaCl | 2 |

The foregoing P-1 medium has a pH of 7.8. A variation of the above is one in which phosphate is supplied in the form of phosphoric acid.

Other optional nutrients which can be included in trace amounts include:

| Component | Conc. (mg./liter) |
| --- | --- |
| $ZnSO_4 \cdot H_2O$ | 0 – 0.4 |
| $Na_2MoO_4 \cdot 2H_2O$ | 0 – 0.06 |
| $Co Cl_2$ | 0 – 1.2 |
| $H_3 BO_3$ | 0 – 0.08 |
| $CuSO_4 \cdot 5H_2O$ | 0 – 0.3 |
| $Ca Cl_2 \cdot 6H_2O$ | 0 – 0.14 |
| $NiCl_2 \cdot 6H_2O$ | 0 – 0.01 |

Of course, the essential and optional nutrients can be supplied in the form of other salts than those tabulated hereinabove.

The fermentation process conducted in this zone 10 is an aerobic process and oxygen is supplied to the cultivation medium via line 2 most conveniently as an oxygen-containing gas, for example, air, which contains from 19 wt. percent to 22 wt. percent of oxygen. While it is preferable to employ air, oxygen enriched air for example, can be used.

The temperature of the biosynthesis bath may be varied between about 20°C. and about 65°C. depending upon the specific microorganism being grown; but preferred temperatures are between about 25°C. and about 45°C., such as about 35°C. The pH is preferably in the range of from about 5.5 to 8.5 such as about 7.0.

At the start of the fermentation, the growth medium, which is sterile, is inoculated with a microorganism selected from the group consisting of *Achromobacter sp.* and *Alcaligenis faecalis*. Representative species of the microorganisms whose use is contemplated in this invention are tabulated hereinbelow along with their corresponding ATCC registration numbers which were secured by depositing samples with American Type Culture Collection in Washington, D.C.

| Microorganism Name | ATCC No. |
|---|---|
| Achromobacter sp. | 21575 |
| Achromobacter sp. | 21576 |
| Achromobacter sp. | 21578 |
| Alcaligenes faecalis | 21577 |

The bacteriological characteristics of these microorganisms as determined by the below tests leading to the above nomenclature is as follows:

TABLE I

| ATCC No. | 21575 | 21576 | 21578 | 21577 |
|---|---|---|---|---|
| Morphology | short rods | short rods | short rods | short rods |
| Motility | motile | motile | motile | motile |
| Gram Reaction | gram-negative | gram-negative | gram-negative | gram-negative |
| Agar Colony Morphology | spreading irregular | spreading irregular | spreading irregular | spreading irregular |
| Pigmentation | beige-orange | beige-orange | beige-orange | beige-orange |
| Growth Temperature | 32°C. | 32°C. | 32°C. | 32°C. |
| Growth pH | 7.0 | 7.0 | 7.0 | 7.0 |
| Sulfide production | − | − | − | − |
| Nitrate reduction | − | − | − | − |
| Oxidase | + | + | + | + |
| Oxidative Acid Production, Height Leifsons Medium | | | | |
| Glucose | + | + | + | − |
| Xylose | + | + | + | − |
| Sucrose | − | − | − | − |
| Fractose | + | + | + | − |
| Lactose | − | − | − | − |
| Citrate | + | + | + | + |
| Litmus Milk | − | − | − | Alk. |

Each of the foregoing microorganisms is surprisingly capable of sustaining a sufficiently high growth rate on a suitable substrate and both protein cells and biopolymer or polysaccharides are produced simultaneously.

The fermentation broth containing the protein cells and biopolymers is withdrawn from zone 10 by means of line 6 and introduced into separation zone 20. Since a considerable quantity of biopolymer has been produced in the fermentation broth, this liquid is highly viscous. Consequently, the broth is first diluted in separation zone 20 with about 2 to 2½ times its volume of water to facilitate separation of the cells by light centrifugation. Preferably, to aid centrifugation, the pH of the broth is adjusted to 6.0 and potassium chloride and an organic solvent are added successively with vigorous agitation. Potassium chloride typically is added in an amount ranging from about 1 to 3 percent by weight based on the total weight of water present in the broth and preferably it is added at about 1 percent by weight. The organic solvent that is added is selected from a group of water soluble oxygenated materials such as ethanol, methanol, isopropyl alcohol and acetone. It is added in an amount ranging generally from about 20 to 30 volume percent and preferably about 25 volume percent based on the total volume of the broth.

In any event, the broth delivered to separation zone 20 is centrifuged or otherwise treated to remove the protein cells and any other suspended impurities. Other means, of course, such as filtration or settling may be employed to concentrate the cells from zone 20. Centrifugation, however, is a preferred technique when practicing this invention.

The protein cells separated in zone 20 are passed to zone 30 by means of line 7 where they are rendered non-viable. Any suitable method of treating microorganisms so that they are non-viable may be employed, for example, heat pasteurization may be used. In this technique, the temperature of the cells are raised to at least 120°C. and held there for at least 30 minutes. Optionally, the microorganism can be spray dried or the cells can be lysed by contacting the cells with acetone, ether, hexane or similar organic materials.

After the microorganisms have been rendered non-viable the protein content can be separated from the cell walls by techniques well known in the art. One method for separating protein is described in U.S. Pat. No. 3,474,688 and that technique is incorporated herein by reference. Thus, the protein cells are withdrawn by means of line 8 while materials associated with the separation of the protein from the cells is withdrawn by means of line 9.

The supernatant liquid containing the bio-polymers is withdrawn from separation zone 20 by means of line 11 and passed into a recovery zone 40. In recovery zone 40 a concentration of organic solvent in a supernatant liquid is increased to about 40 to 60 percent by volume. When the organic solvent is methanol, preferably its concentration is increased to about 42 percent by volume; whereas, when the organic solvent is ethanol its concentration is increased to about 55 percent by volume. Increasing the concentration of the organic solvent results in precipitation of the polysaccharide or bio-polymer as finely divided and non-cohesive gel-like particles. These particles can be separated from a liquid by supercentrifugation or filtration. The concentrated precipitate can then be dried by means of conventional rotary drum drier, vacuum dryer or spray dryer. The bio-polymers are separated in recovery zone 40 and removed by means of line 12 while the supernatant liquid is removed by means of line 13.

While not shown, the supernatant liquid removed by means of line 13 can be recycled to zone 20. While the foregoing process contemplates separation of the protein from the bio-polymer, it should be understood it is not always essential that separation of the protein from the polymer product be carried out. If the polysaccharide is to be employed, for example, as an oil drilling mud or in similar applications, separation of the protein from the bio-polymer may be an unnecessary and undesirable step. Of course, if the polymer is to be employed in a food product or an emulsifying, thickening or gelling agent material, separation and purification according to the foregoing steps will be dictated by the end use requirements.

The bio-polymers produced simultaneously with protein cells in the practice of the instant invention include polysaccharides and heteropolysaccharides, which upon hydrolysis gives lactose, glucose, dextrose, mannose and L-fructose, D-galactose, gluscoamine hydrochloride, galactosamine hydrochloride, D- and N-acetyl glucosamine.

The present invention is illustrated in greater detail by the examples which follow but these examples should not be construed as limiting the scope hereof.

EXAMPLE 1

A growth medium of the following composition was prepared.

| Component | Conc. grams/liter |
|---|---|
| Ethanol | 10.0 |
| $H_3PO_4$ (85%) | 1.50 |
| $K_2SO_4$ | 0.25 |
| $Na_2SO_4$ | 0.25 |
| $MgSO_4 \cdot 7H_2O$ | 0.50 |
| $FeSO_4 \cdot 7H_2O$ | 0.02 |
| $MnSO_4 \cdot 4H_2O$ | 0.02 |
| Water | Balance |

After regulating the pH from 6.8 to 7.2 the above media was introduced into a flask and sterilized by heating at 121°for 20 minutes. Then approximately 0.5 grams per liter of *Achromobacter, sp.* (ATCC No. 21575) previously cultured for 24 hours at 35°C. temperature in the same medium was inoculated into the fermentation growth medium. After several hours, an adequate cell population was obtained and continuous operation at a residence time of 2 hours was begun. Sterilized medium was added continuously to the fermentor and fermentor broth containing a cell concentration of 6 grams per liter was continuously withdrawn. Additionally, about 1.2 grams per liter of polysaccharide was contained in the fermentor broth. These cells when dried were found to contain approximately 75 percent protein (N × 6.25).

The viscosity of the fermentor broth was measured on a Brookfield viscometer, Model LVF, using a No. 1 Spindle after first diluting the broth with an equal volume of water. The results are as follows:

| Viscometer speed, rpm | Viscosity in Centipoises |
|---|---|
| .6 | 263 |
| 12 | 169 |
| 30 | 92 |
| 60 | 58 |

As can be seen from the foregoing, the broth is thixotropic in nature, thereby indicating its usefullness in a drilling mud system.

The biopolymer was easily separated from the broth by first removing the protein cells after a light centrifugation of the broth (3,000 rpm for 15 minutes). The supernatant liquid was treated with an equal volume of acetone and centrifuged at 10,000 rpm for 15 minutes thereby isolating the bio-polymer.

Similar results were obtained with the other cultures set forth in the specification.

What is claimed is:

1. A process for simultaneously producing biopolymer and bacteria cells in a single fermentation zone comprising continuously cultivating a microorganism selected from the group consisting of *Achromobacter sp.* ATCC 21575, ATCC No. 21576, ATCC No. 21578, *Alcaligenes faecalis* ATCC No. 21577 on an oxygenated hydrocarbon feed in a media comprising an aqueous growth medium containing oxygen and other essential cell nutrients at temperatures ranging from about 20°to about 65°C.

2. A process according to claim 1 wherein a microorganism is *Alcaligenes faecalis* ATCC No. 21577.

3. A process according to claim 1 wherein a microorganism is *Acromobacter sp* ATCC No. 21575, ATCC No. 21576, ATCC No. 21578.

4. A process according to claim 1 wherein a protein and bio-polymer are transferred to a separation zone and therein treated to separate the protein from the bio-polymer.

5. A process according to claim 1 wherein the oxygenated hydrocarbon feed is ethanol.

6. A process for the production of bacterial cells and biopolymers in a single stage reactor comprising: inoculating a stirred single stage reactor containing a sterile media comprising an aqueous growth medium containing oxygen and other essential cell nutrients at temperatures ranging from about 20 °to 65°C. with a microorganism selected from the group consisting of *Achromobacter sp.* ATCC No. 21575, ATCC No. 21576, ATCC No. 21578, and *Alcaligenes faecalis*, ATCC No. 21577; thereafter continuously supplying an oxygenated hydrocarbon and said sterile media to said single stage reactor whereby biopolymers are simultaneously produced with bacterial cells; and, continuously removing a mixture of biopolymer, bacteria, aqueous medium and unconverted oxygenated hydrocarbons.

7. The process according to claim 6 wherein the oxygenated hydrocarbon is ethanol.

8. The process of claim 6 wherein the temperature ranges from about 25°C. to about 45°C.

9. The process of claim 6 wherein the mixture removed from the stirred reactor is transferred to a separation zone and therein treated to separate the bacterial cells from the biopolymer.

* * * * *